United States Patent
Meure et al.

(10) Patent No.: US 10,081,722 B2
(45) Date of Patent: Sep. 25, 2018

(54) THREE-DIMENSIONAL FILAMENT NETWORK FOR A COMPOSITE LAMINATE

(71) Applicant: The Boeing Company, Chicago, IL (US)

(72) Inventors: Samuel James Meure, Heatherton (AU); Christopher Alan Howe, Albert Park (AU); Thomas Wilson, Port Melbourne (AU)

(73) Assignee: The Boeing Company, Chicago, IL (US)

( * ) Notice: Subject to any disclaimer, the term of this patent is extended or adjusted under 35 U.S.C. 154(b) by 723 days.

(21) Appl. No.: 14/224,278

(22) Filed: Mar. 25, 2014

(65) Prior Publication Data

US 2015/0274934 A1 Oct. 1, 2015

(51) Int. Cl.
| | |
|---|---|
| C08K 7/02 | (2006.01) |
| B29C 70/02 | (2006.01) |
| B29C 70/08 | (2006.01) |
| B29C 70/30 | (2006.01) |
| B29L 9/00 | (2006.01) |

(52) U.S. Cl.
CPC .............. *C08K 7/02* (2013.01); *B29C 70/021* (2013.01); *B29C 70/081* (2013.01); *B29C 70/30* (2013.01); *B29L 2009/00* (2013.01)

(58) Field of Classification Search
CPC ....... B29C 70/081; B29C 70/30; B29C 70/02; B29L 2009/00; B29L 2900/00; C08K 7/02; B29K 2105/126; Y10T 428/23914

USPC .................. 264/258; 523/222; 428/298.1, 86
See application file for complete search history.

(56) References Cited

U.S. PATENT DOCUMENTS

| | | | | |
|---|---|---|---|---|
| 3,334,166 A | * | 8/1967 | Marzocchi ............ | B29B 15/122 264/134 |
| 3,808,087 A | * | 4/1974 | Milewski ................ | B22F 3/002 156/148 |

(Continued)

FOREIGN PATENT DOCUMENTS

| | | |
|---|---|---|
| FR | 1384909 A | 1/1965 |
| FR | 2198822 A1 | 4/1974 |
| WO | 9921697 A1 | 5/1999 |

OTHER PUBLICATIONS

Canadian Office Action dated Apr. 14, 2016, regarding application No. 2873730, 4 pages.

(Continued)

*Primary Examiner* — Camie S Thompson
(74) *Attorney, Agent, or Firm* — Yee & Associates, P.C.

(57) ABSTRACT

A method and apparatus for forming a composite structure. The apparatus comprises a fiber layer. The fiber layer comprises a plurality of fiber bundles and a number of filler portions. The plurality of fiber bundles has a number of spaces between the plurality of fiber bundles. A number of filler is comprised of discontinuous filaments that substantially fill the number of spaces between the plurality of fiber bundles.

20 Claims, 11 Drawing Sheets

(56) References Cited

U.S. PATENT DOCUMENTS

| | | | |
|---|---|---|---|
| 3,847,707 | A | 11/1974 | Evans et al. |
| 3,943,090 | A | 3/1976 | Enever |
| 4,141,929 | A | 2/1979 | Stoops et al. |
| 5,028,478 | A | 7/1991 | Odagiri et al. |
| 5,344,689 | A * | 9/1994 | Ide .................... B32B 5/26 428/114 |
| 5,605,745 | A | 2/1997 | Recker et al. |
| 6,306,474 | B1 * | 10/2001 | Yoshioka ............... A63B 53/10 428/298.1 |
| 6,503,856 | B1 | 1/2003 | Broadway et al. |
| 6,740,185 | B2 | 5/2004 | Baldwin |
| 7,037,865 | B1 | 5/2006 | Kimberly |
| 7,435,693 | B2 | 10/2008 | Tsotsis et al. |
| 8,080,313 | B2 | 12/2011 | Bonneau et al. |
| 8,088,470 | B2 | 1/2012 | Dolby |
| 8,101,106 | B2 | 1/2012 | Ellis |
| 9,312,827 | B2 | 4/2016 | Qureshey et al. |
| 2005/0006301 | A1 | 1/2005 | Angelini et al. |
| 2006/0191115 | A1 | 8/2006 | Carter et al. |
| 2006/0269738 | A1 | 11/2006 | Kimberly |
| 2009/0110901 | A1 | 4/2009 | Gaw et al. |
| 2009/0130376 | A1 | 5/2009 | Berkel et al. |
| 2012/0064283 | A1 | 3/2012 | Hill et al. |
| 2013/0065471 | A1 | 3/2013 | Mortimer |
| 2013/0143006 | A1 | 6/2013 | Ferguson |

OTHER PUBLICATIONS

Extended European Search Report, dated Jul. 3, 2015, regarding Application No. EP15151726.5, 7 pages.
Canadian Intellectual Property Office Examination Report, dated Jan. 9, 2017, regarding Application No. 2,873,730, 4 pages.
State Intellectual Property Office of PRC Notification of Second Office Action, dated Sep. 26, 2017, regarding Application No. 2015101341224, 8 pages.
Canadian Intellectual Property Office Examination Report, dated Sep. 26, 2017, regarding Application No. 2,873,730, 4 pages.
State Intellectual Property Office of the PRC Notification of Third Office Action, dated Feb. 26, 2018, regarding Application No. 2015101341224, 8 pages.
Australian Government Patent Office Examination Report, dated Feb. 21, 2018, regarding Application No. 2014274534, 3 pages.
State Intellectual Property Office of PRC Notification of Office Action, dated Jun. 19, 2017, regarding Application No. 2015101341224, 40 pages. English translation of claims only.
European Patent Office Communication, dated Mar. 21, 2018, regarding Application No. EP15151726.5, 4 pages.
State Intellectual Property Office of the PRC Notification of the Fourth Office Action and English translation, dated Jul. 11, 2018, regarding Application No. 2015101341224, 18 pages.

* cited by examiner

THREE-DIMENSIONAL FILAMENT NETWORK FOR A COMPOSITE LAMINATE

BACKGROUND INFORMATION

1. Field

The present disclosure relates generally to composite structures and, in particular, to composite laminates. Still more particularly, the present disclosure relates to a method and apparatus for improving the through-thickness strength of a composite laminate using a filament network.

2. Background

A composite laminate is formed by one or more composite layers, which are also referred to as plies or lamina. Each composite layer includes a reinforcement material and a matrix material. The reinforcement material may take the form of, for example, fibers, which may be oriented in a single direction to make the composite layer unidirectional or in two directions to make the composite layer bidirectional. The matrix material may take the form of, for example, a resin.

Fiber bundles may be laid up in layers to form a reinforcement layup, which may be referred to as a preform. The preform may be a referred to as a wet preform when the fiber bundles have been pre-impregnated with resin that has been partially cured for handling or a dry preform when no resin is present. Resin is infused within the spaces between the fiber bundles of the preform to form an integrated preform. The integrated preform may be partially cured to form a partially cured composite laminate or fully cured to form a fully cured composite laminate. A carbon fiber-reinforced polymer (CFRP) laminate is an example of one type of composite laminate.

In some cases, an undesired inconsistency may develop within the composite laminate. An undesired inconsistency is an inconsistency that is outside of selected tolerances or beyond some selected threshold for the inconsistency. An undesired inconsistency may take the form of, for example, a crack, a thermally-induced crack, a notch, a delamination, or some other type of inconsistency that is outside of selected tolerances.

The ability of a composite laminate to absorb energy in the presence of an undesired inconsistency, while still performing within selected tolerances, is commonly referred to as the notch toughness of the composite laminate. Improving the notch toughness of a composite laminate, while still allowing a resin to be effectively infused between and around the fibers, may be more difficult than desired. Some currently available methods for improving the notch toughness of a composite laminate may reduce the performance of the composite laminate in other areas.

For example, one currently available solution includes laying up a sheet of discontinuous fibers between each pair of composite layers in the composite laminate. However, this type of solution improves the notch toughness of the composite laminate but reduces the resistance of the composite laminate to the formation of undesired inconsistencies.

Other currently available solutions include Z-pinning, stitching, and tufting. Z-pinning includes forcing pins through the reinforcement layup or the uncured preform in a Z direction. Stitching and tufting include threading fibers through the reinforcement layup or the uncured preform in the Z direction. However, these types of solutions may still reduce the resistance of the composite laminate to the formation of undesired inconsistencies, cause undesired effects to the fibers, and limit the sizes and positioning of the pins or threads that can be used. Therefore, it would be desirable to have a method and apparatus that take into account at least some of the issues discussed above, as well as other possible issues.

SUMMARY

In one illustrative embodiment, an apparatus comprises a fiber layer. The fiber layer comprises a plurality of fiber bundles and a number of filler portions. The plurality of fiber bundles has a number of spaces between the plurality of fiber bundles. A number of filler portions is comprised of discontinuous filaments that substantially fill the number of spaces between the plurality of fiber bundles.

In another illustrative embodiment, a composite structure comprises a number of fiber layers, a filament network associated with the number of fiber layers, and a resin. Each fiber layer in the number of fiber layers includes a plurality of fiber bundles having a number of spaces between the plurality of fiber bundles. The filament network is configured to improve a notch toughness of the composite structure and a resistance of the composite structure to a number of undesired inconsistencies. The filament network comprises a number of filler portions that fill the number of spaces between the plurality of fiber bundles in each of the number of fiber layers. A filler portion in the number of filler portions comprises a plurality of discontinuous filaments and a binding material. The binding material is configured to hold the plurality of discontinuous filaments together. The binding material is further configured to bind the plurality of discontinuous filaments to at least one of the plurality of fiber bundles. The resin binds the number of fiber layers and the filament network associated with the number of fiber layers together.

In yet another illustrative embodiment, a method for forming a composite structure is provided. A number of filament layers comprised of discontinuous filaments is positioned relative to a plurality of fiber bundles to form a fiber layer having a number of filler portions that substantially fill a number of spaces between the plurality of fiber bundles. A reinforcement layup is formed for the composite structure using the fiber layer.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account different considerations. For example, the illustrative embodiments recognize and take into account that it may be desirable to have a method and apparatus for improving the notch toughness of a composite laminate, while also maintaining at least a desired level of resistance to the formation and growth of undesired inconsistencies. In particular, the illustrative embodiments recognize and take into account that it may be desirable to improve the notch toughness of a composite laminate, while still allowing a resin to be effectively infused within the reinforcement layup for the composite laminate.

Thus, the illustrative embodiments provide a method and apparatus for forming a reinforcement layup for a composite laminate that allows a resin to be infused within the layup with a desired level of ease and improves the notch toughness of the composite laminate formed using the reinforcement layup. In one illustrative example, a number of fiber layers are laid up to form a reinforcement layup. Each fiber layer in the number of fiber layers may include a plurality of fiber bundles having a number of spaces between the plurality of fiber bundles and filament filters comprised of discontinuous filaments that fill the number of spaces between the plurality of fiber bundles. A resin may be infused into the reinforcement layup to form an uncured preform. The uncured preform may then be cured to form the composite laminate.

Figure 1:
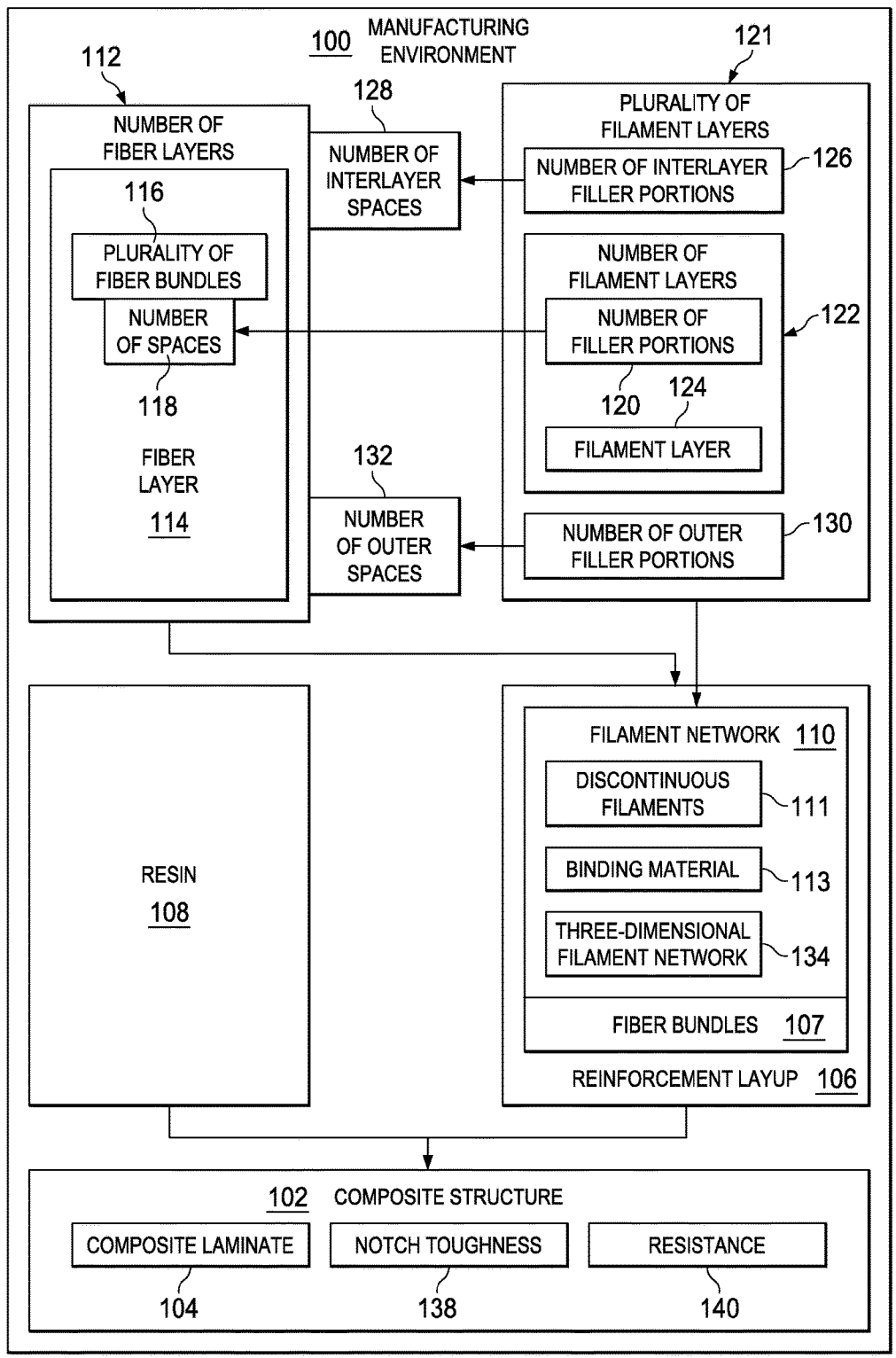
FIG. 1 is an illustration of a manufacturing environment in the form of a block diagram in accordance with an illustrative embodiment.

Referring now to the figures and, in particular, with reference to FIG. 1, an illustration of a manufacturing environment is depicted in the form of a block diagram in accordance with an illustrative embodiment. In this illustrative example, manufacturing environment 100 is an example of an environment in which composite structure 102 may be manufactured. Composite structure 102 takes the form of composite laminate 104 in this illustrative example.

As depicted, composite structure 102 is formed by integrating resin 108 with reinforcement layup 106. Reinforcement layup 106 may also be referred to as a preform. As used herein, "integrating" resin 108 with reinforcement layup 106 means causing resin 108 to be located within reinforcement layup 106. This integration may be performed by, for example, without limitation, infusing reinforcement layup 106 with resin 108, injecting resin 108 into reinforcement layup 106, saturating reinforcement layup 106 with resin 108, mixing resin 108 with reinforcement layup 106, impregnating resin 108 with reinforcement layup 106, or some combination thereof.

In this illustrative example, reinforcement layup 106 is infused with resin 108. Resin 108 is comprised of at least one polymer. For example, resin 108 may be a polymeric resin comprised of at least one of a thermosetting polymer, a thermoplastic polymer, or some other type of polymer.

As used herein, the phrase "at least one of," when used with a list of items, means different combinations of one or more of the listed items may be used and only one of the items in the list may be needed. The item may be a particular object, thing, action, process, or category. In other words, "at least one of" means any combination of items or number of items may be used from the list, but not all of the items in the list may be required.

For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Infusing resin 108 within reinforcement layup 106 forms composite structure 102 that may then be left uncured, partially cured, or fully cured, depending on the implementation. This composite structure 102 may be referred to as an integrated preform. When left uncured, composite structure 102 may be referred to as an integrated preform or an uncured composite structure. The integrated preform may be partially cured to take the form of a partially cured composite structure. This partial curing may be performed to allow easier transport and handling of the composite structure. The integrated preform may be fully cured to take the form of a fully cured composite structure.

In this illustrative example, reinforcement layup 106 includes fiber bundles 107 and filament network 110 that together form number of fiber layers 112. As used herein, a "number of" items may include one or more items. In this manner, number of fiber layers 112 may include one or more layers.

Filament network 110 is comprised of discontinuous filaments 111 and binding material 113. Discontinuous filaments 111 may be fibers that do not extend the entire length or width of composite structure 102. Discontinuous filaments 111 may include filaments of at least one of different sizes, different diameters, different cross-sectional shapes, different types, or some combination thereof. Discontinuous filaments 111 may include at least one of carbon fibers, silica fibers, glass fibers, polyamide fibers, polyether ketone fibers, polyester fibers, polyether sulfone fibers, polyimide fibers, polyurethane fibers, or other types of fibers.

Further, in this illustrative example, discontinuous filaments 111 may have a random orientation relative to each other. However, in other illustrative examples, discontinuous filaments 111 may not be randomly oriented relative to each other.

Binding material 113 is configured to bind filament network 110 to fiber bundles 107 and fiber bundles 107 to each other. Binding material 113 is configured to hold discontinuous filaments 111 together in response to at least one of heat, pressure, or a chemical reaction being applied to binding material 113. Binding material 113 holds discontinuous filaments 111 together during handling.

Binding material 113 may take a number of different forms. For example, binding material 113 may be comprised of at least one of a thermoset material, a thermoplastic material, or some other type of binding material. Further, binding material 113 may be implemented in a form selected from at least one of beads, threads, pieces of tape, or some other form, depending on the implementation.

Fiber layer 114 is an example of one of number of fiber layers 112. Fiber layer 114 includes plurality of fiber bundles 116 having number of spaces 118 between plurality of fiber bundles 116. In this illustrative example, a fiber bundle in plurality of fiber bundles 116 is an untwisted grouping of fibers that run substantially parallel to each other. The fibers that form a fiber bundle in plurality of fiber bundles 116 may be continuous fibers. As used herein, a "continuous fiber" may be a long fiber that extends across substantially the entire length or width of composite structure 102.

A fiber bundle in plurality of fiber bundles 116 may be selected from at least one of a tow, a ribbon, or a piece of tape, depending on the implementation. A fiber bundle may be implemented as a unidirectional tow in some cases. Depending on the implementation, plurality of fiber bundles 116 may include the same or different types of fiber bundles. In other illustrative examples, a fiber bundle may be a twisted grouping of fibers, a braided grouping of fibers, or some other type of grouping of fibers.

In this illustrative example, the density of continuous fibers in a fiber bundle in plurality of fiber bundles 116 is sufficiently high such that the porosity of the fiber bundle is below a selected threshold. This selected threshold may be selected such that the permeability of the fiber bundle with respect to resin 108 is below a selected threshold.

As used herein, the "porosity" of an item is the measure of how much open space is present within the item. The open space may be in the form of, for example, without limitation, openings, voids, gaps, or some other type of open space. Further, as used herein, the "permeability" of an item may be the measure of the ease with which a fluid, resin 108 in these illustrative examples, can move through the item. Typically, increased porosity results in increased permeability.

In this illustrative example, the porosity and permeability of each of plurality of fiber bundles 116 may be low. In particular, the permeability of a fiber bundle in plurality of fiber bundles 116 may be sufficiently low such that resin 108 permeates, or flows, through a fiber bundle in plurality of fiber bundles 116 very slowly when resin 108 is infused within reinforcement layup 106.

In other illustrative examples, one or more of plurality of fiber bundles 116 may be pre-impregnated with a resin that is the same type as or a different type than resin 108. When plurality of fiber bundles 116 is pre-impregnated with a resin, reinforcement layup 106 may be referred to as a wet preform. When plurality of fiber bundles 116 is not pre-impregnated with a resin, reinforcement layup 106 may be referred to as a dry preform.

Plurality of fiber bundles 116 may be arranged such that plurality of fiber bundles 116 run substantially parallel to each other and have number of spaces 118 between plurality of fiber bundles 116. In one illustrative example, the fibers in plurality of fiber bundles 116 include, for example, without limitation, carbon fibers, glass fibers, boron fibers, other types of fibers, or some combination thereof.

Fiber layer 114 also includes number of filler portions 120 of filament network 110 that substantially fill number of spaces 118 between plurality of fiber bundles 116. As used herein, a filler portion in number of filler portions 120 is a portion of filament network 110.

Plurality of filament layers 121 are positioned relative to the plurality of fiber bundles in each fiber layer in number of fiber layers 112 to form filament network 110. In particular, plurality of filament layers 121 are positioned relative to the plurality of fiber bundles in each fiber layer in number of fiber layers 112 and the number of filler portions that fill the number of spaces between the plurality of fiber bundles in each of number of fiber layers 112.

For example, number of filament layers 122 in plurality of filament layers 121 may be used to form at least one of number of fiber layers 112. For example, number of filament layers 122 may be positioned relative to plurality of fiber bundles 116 to form fiber layer 114. Each of number of filler portions 120 is formed by one or more portions of one or more filament layers in number of filament layers 122. In one illustrative example, one portion of one filament layer is used to form one portion of number of filler portions 120. In another illustrative example, portions of two different filament layers may be used to form one portion of number of filler portions 120.

Filament layer 124 is an example of one of number of filament layers 122. Filament layer 124 may be implemented as at least one of a veil, a nonwoven mat, a web, a sheet, a tape, or some other type of collection of discontinuous filaments.

The density of discontinuous filaments in a filament layer in plurality of filament layers 121, such as filament layer 124, is lower than the density of continuous fibers in a fiber bundle in plurality of fiber bundles 116. In particular, the density of discontinuous filaments in plurality of filament layers 121 is sufficiently low such that the porosity of each of plurality of filament layers 121 is above a selected threshold.

This selected threshold may be selected such that the permeability of each of plurality of filament layers 121 with respect to resin 108 is above a selected threshold. In particular, in this illustrative example, each of plurality of filament layers 121 may have a permeability sufficiently high to allow resin 108 to permeate, or flow through, the filament layer when resin 108 is infused within reinforcement layup 106.

The porosity of plurality of filament layers 121 may provide open spaces through which a fluid, such as resin 108, may flow. Other types of fluids may also be allowed to flow through the open spaces within plurality of filament layers 121. For example, air and gases may be allowed to permeate through plurality of filament layers 121. Further, in some cases, these open spaces may be used to remove at least one of air, undesired gases, or excess moisture from reinforcement layup 106.

In one illustrative example, filament layer 124 is wrapped around a fiber bundle in plurality of fiber bundles 116 such that filament layer 124 covers an entirety of the outer surface of the fiber bundle. This process may be repeated for each fiber bundle in plurality of fiber bundles 116. In other words, a filament layer in number of filament layers 122 may be wrapped around each of plurality of fiber bundles 116. Plurality of fiber bundles 116 are then arranged relative to each other such that fiber layer 114 is formed.

In one illustrative example, plurality of fiber bundles 116 is arranged such that the fiber bundles in plurality of fiber bundles 116 run substantially parallel to each other. In this example, each of number of filler portions 120 is formed by a first portion of a first filament layer in number of filament layers 122 and a second portion of a second filament layer in number of filament layers 122. Of course, in other illustrative examples, number of filament layers 122 may be used to form fiber layer 114 in other ways.

In this illustrative example, each of number of fiber layers 112 is formed in a manner similar to fiber layer 114 such that each of number of fiber layers 112 includes a plurality of fiber bundles having a number of spaces between the plurality of fiber bundles that are filled by a number of filler portions of filament network 110.

Number of fiber layers 112 is then laid up to form reinforcement layup 106. In other words, the fiber layers in number of fiber layers 112 are stacked at least one of, for example, without limitation, one on top of the other or side-by-side to form reinforcement layup 106. In forming reinforcement layup 106, filament network 110 is formed. In particular, plurality of filament layers 121 may be positioned relative to the plurality of fiber bundles in each of number of fiber layers 112 such that filament network 110 includes number of interlayer filler portions 126 and number of outer filler portions 130, in addition to the number of filler portions in the number of spaces between the plurality of fiber bundles in each of number of fiber layers 112.

Number of interlayer filler portions 126 substantially fills number of interlayer spaces 128 between number of fiber layers 112. Number of outer filler portions 130 substantially fills number of outer spaces 132 around number of fiber layers 112. In this illustrative example, filament network 110 includes the number of filler portions in each of number of fiber layers 112, number of interlayer filler portions 126, and number of outer filler portions 130. Filament network 110 may take the form of three-dimensional filament network 134.

Once reinforcement layup 106 has been formed, reinforcement layup 106 is cured such that binding material 113 binds filament network 110 to fiber bundles 107, fiber bundles 107 to each other, and number of fiber layers 112 to each other. The three-dimensional nature of filament network 110 strengthens reinforcement layup 106 in the three dimensions.

Resin 108 may be infused within reinforcement layup 106 such that resin 108 fills the open spaces of filament network 110 to form composite structure 102. These open spaces are the open spaces within plurality of filament layers 121. Additionally, depending on the implementation, resin 108 may also fill any spaces within each of the fiber bundles in reinforcement layup 106.

Filament network 110 may improve notch toughness 138 of composite structure 102, resistance 140 of composite structure 102 to one or more types of undesired inconsistencies, or both. Notch toughness 138 is the ability of composite structure 102 to absorb energy in the presence of one or more undesired inconsistencies. For example, filament network 110 may improve notch toughness 138 of composite structure 102 with respect to delamination, cracking, micro-cracking, and other types of undesired inconsistencies.

In one illustrative example, discontinuous filaments 111 of filament network 110 toughen composite structure 102, while also maintaining at least a desired level of resistance 140 to undesired inconsistencies. Resistance 140 is the ability of composite structure 102 to prevent the formation, growth, or both of one or more types of undesired inconsistencies. Filament network 110 may help reduce or prevent the growth of undesired inconsistencies. Reducing or preventing the growth of undesired inconsistencies may reduce or prevent affecting a larger area of composite structure 102 than desired.

In one illustrative example, when composite structure 102 is substantially planar, resistance 140 may be increased such that the area of composite structure 102, with respect to the x-y plane of composite structure 102, affected by an undesired inconsistency does not increase in size more than desired.

The illustration of manufacturing environment 100 in FIG. 1 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

For example, in some cases, filament network 110 may only include number of interlayer filler portions 126 and the number of filler portions in each of number of fiber layers 112. In some illustrative examples, filament network 110 may be configured to improve other mechanical properties of composite structure 102 in addition to notch toughness 138 and resistance 140.

Figure 2:
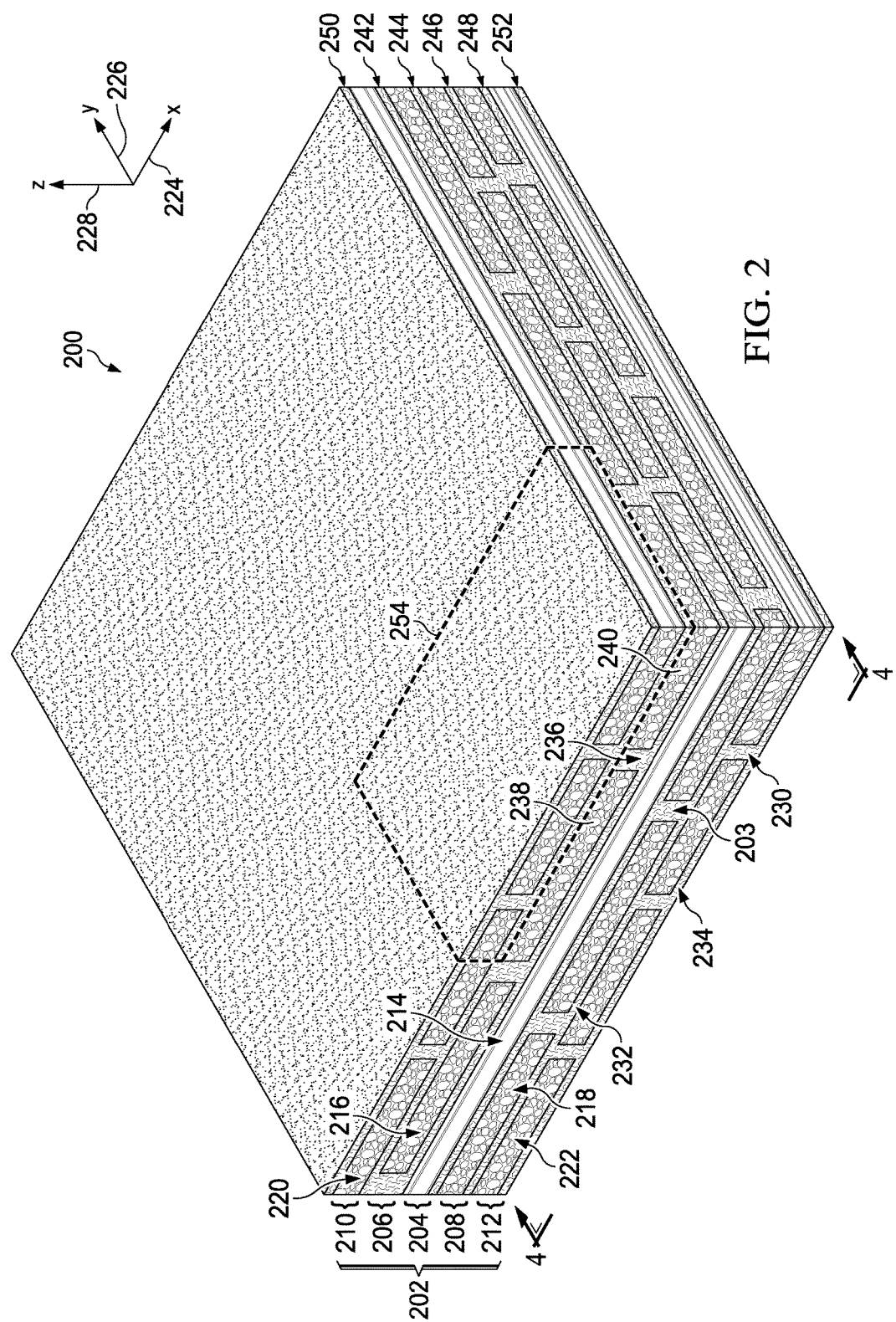
FIG. 2 is an illustration of a portion of a reinforcement layup in accordance with an illustrative embodiment.

With reference now to FIG. 2, an illustration of a portion of a reinforcement layup is depicted in accordance with an illustrative embodiment. In this illustrative example, reinforcement layup 200 is an example of one implementation for reinforcement layup 106 in FIG. 1.

As depicted, reinforcement layup 200 includes number of fiber layers 202 and filament network 203. Number of fiber layers 202 and filament network 203 are examples of implementations for number of fiber layers 112 and filament network 110, respectively, in FIG. 1.

Number of fiber layers 202 includes fiber layers 204, 206, 208, 210, and 212. Fiber layer 204 includes plurality of fiber bundles 214 that run substantially parallel to each other. Fiber layer 206 includes plurality of fiber bundles 216 that run substantially parallel to each other. Similarly, fiber layer 208 includes plurality of fiber bundles 218 that run substantially parallel to each other. Fiber layer 210 includes plurality of fiber bundles 220 that run substantially parallel to each other. Fiber layer 212 includes plurality of fiber bundles 222 that run substantially parallel to each other.

Plurality of fiber bundles 214 run substantially parallel to x-axis 224. Plurality of fiber bundles 216 and plurality of fiber bundles 218 run at a 45 degree angle relative to x-axis 224. Plurality of fiber bundles 220 and plurality of fiber bundles 222 run substantially parallel to y-axis 226. Thus, plurality of fiber bundles 220 and plurality of fiber bundles 222 run substantially perpendicular to plurality of fiber bundles 214.

In this illustrative example, filament network 203 includes filler portions 230, number of interlayer filler portions 232, and number of outer filler portions 234. Filler portions 230, number of interlayer filler portions 232, and number of outer filler portions 234 are examples of one implementation for the number of filler portions in each of number of fiber layers 112, number of interlayer filler portions 126, and number of outer filler portions 130, respectively, in FIG. 1.

Filler portions 230 run substantially parallel to z-axis 228 in this illustrative example. Filler portion 236 is an example of one of filler portions 230. Filler portion 236 fills the space between fiber bundle 238 and fiber bundle 240, which may be examples of two fiber bundles in plurality of fiber bundles 216.

Number of interlayer filler portions 232 includes interlayer filler portions 242, 244, 246, and 248. These interlayer filler portions fill the interlayer spaces between number of fiber layers 202. Number of outer filler portions 234 includes outer filler portion 250 and outer filler portion 252. These outer filler portions fill the outer spaces around number of fiber layers 202. A cutaway view of reinforcement layup 200 with portion 254 of fiber layer 210, outer filler portion 250, and interlayer filler portion 242 cutaway is depicted in FIG. 3 below.

Resin may be infused within reinforcement layup 200 to form a composite structure. Filament network 203 provides a plurality of pathways that allow resin to be infused within reinforcement layup 200. Filament network 203 increases the notch toughness of the composite structure formed when resin 108 from FIG. 1, is infused within reinforcement layup 200. Further, filament network 203 may also increase the resistance of the composite structure to the formation, growth, or both of undesired inconsistencies.

Figure 3:
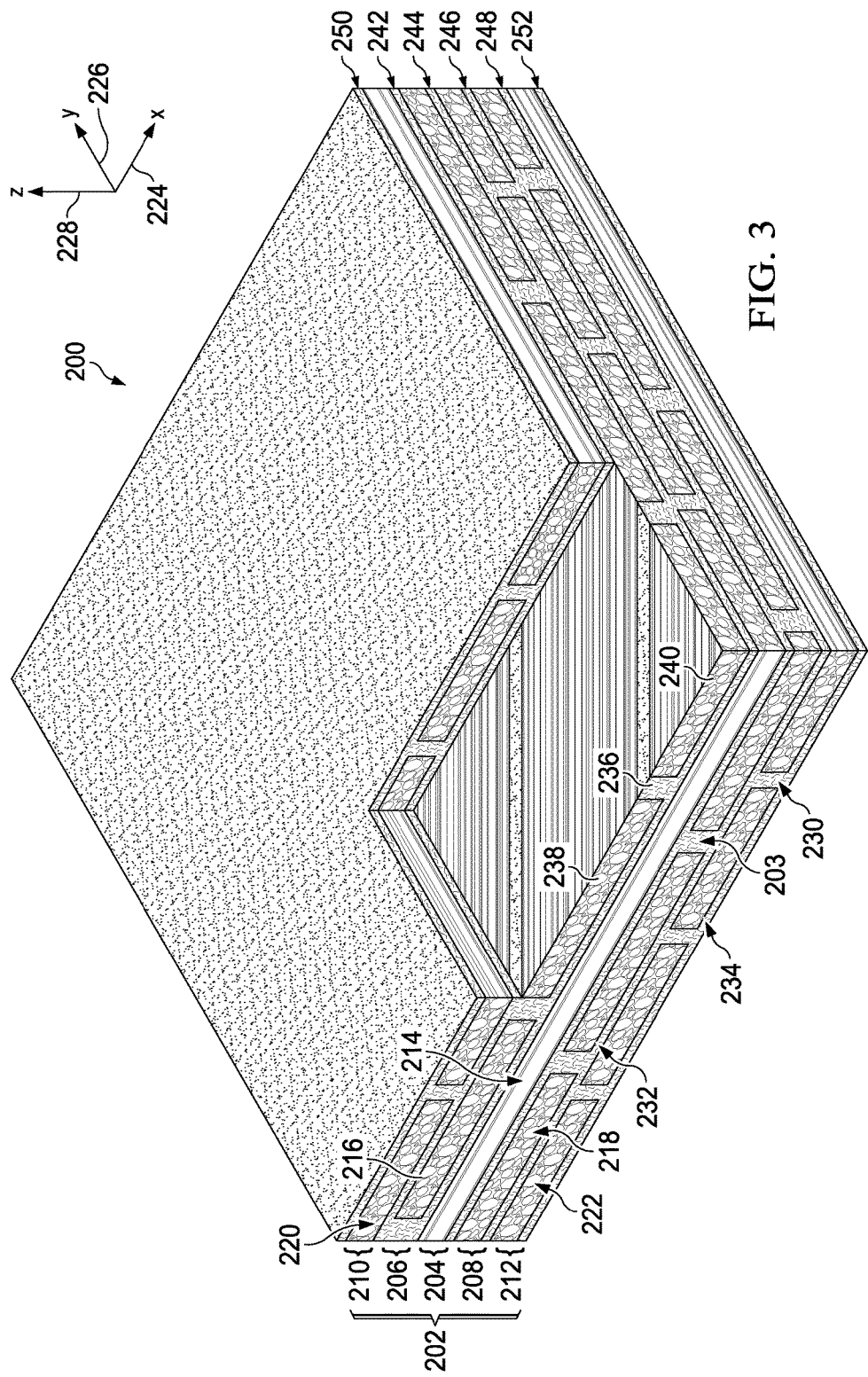
FIG. 3 is an illustration of a cutaway view of a reinforcement layup with a portion of the reinforcement layup removed in accordance with an illustrative embodiment.

With reference now to FIG. 3, an illustration of a cutaway view of reinforcement layup 200 with portion 254 of reinforcement layup 200 from FIG. 2 removed is depicted in accordance with an illustrative embodiment. In this illustrative example, a cross-sectional view of reinforcement layup 200 from FIG. 2 is depicted taken along lines 3-3 in FIG. 2.

The orientation of plurality of fiber bundles 216 may be more clearly seen in this illustrative example. Further, as depicted, filament network 203 is a three-dimensional filament network.

Figure 4:
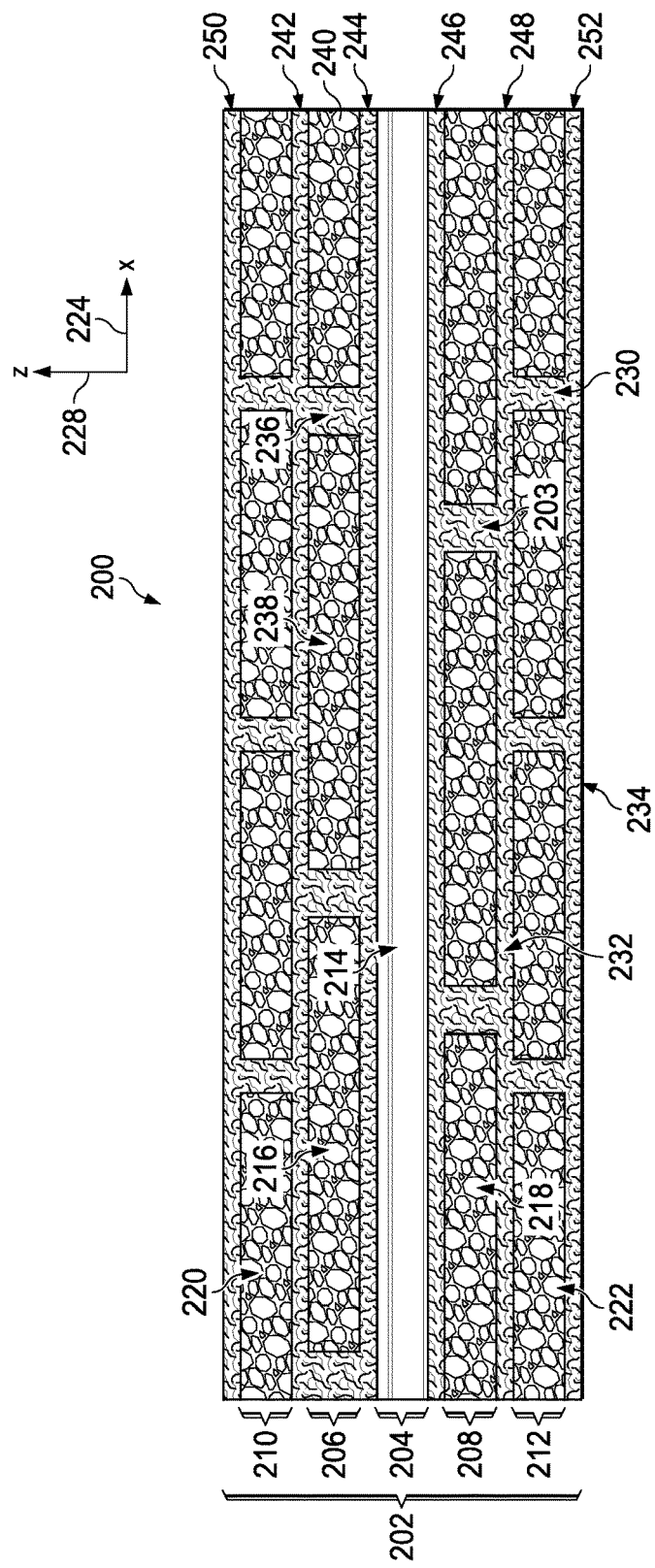
FIG. 4 is an illustration of a side view of a reinforcement layup in accordance with an illustrative embodiment.

With reference now to FIG. 4, an illustration of a side view of reinforcement layup 200 from FIG. 2 is depicted in accordance with an illustrative embodiment. In this illustrative example, a side view of reinforcement layup 200 from FIG. 2 is depicted in the direction of lines 4-4 in FIG. 2.

With reference now to FIGS. 5-11, illustrations of different ways in which a filament layer may be positioned relative to a fiber bundle are depicted in accordance with an illustrative embodiment. The manner in which a filament layer is positioned relative to a fiber bundle in FIGS. 5-11 may be used in multiple fiber bundles that may then be arranged to form one or more fiber layers, such as number of fiber layers 112 in FIG. 1.

Figure 5:
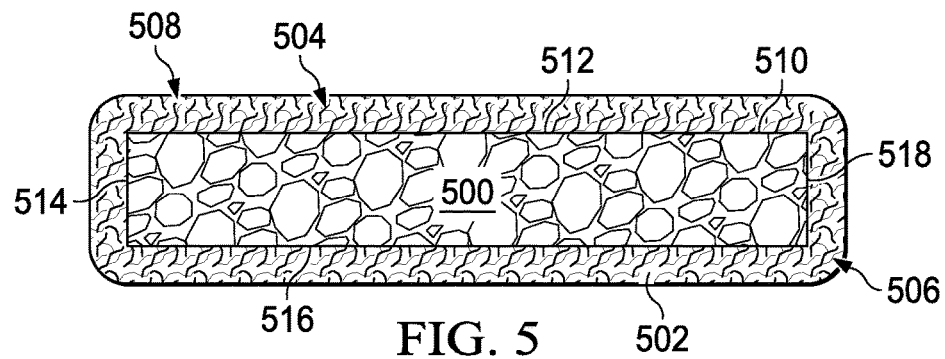
FIG. 5 is an illustration of a filament layer positioned relative to a fiber bundle in accordance with an illustrative embodiment.

Referring now to FIG. 5, an illustration of a filament layer positioned relative to a fiber bundle is depicted in accordance with an illustrative embodiment. In this illustrative example, fiber bundle 500 is an example of one implementation for a fiber bundle in plurality of fiber bundles 116 in FIG. 1.

Filament layer 502 is positioned relative to fiber bundle 500. Filament layer 502 is an example of one implementation for a filament layer in plurality of filament layers 121 in FIG. 1. As depicted, filament layer 502 is comprised of discontinuous filaments 504, binding material 506, and openings 508.

Filament layer 502 is wrapped around fiber bundle 500 such that filament layer 502 substantially covers outer surface 510 of fiber bundle 500. In particular, filament layer 502 covers an entirety of outer surface 510 of fiber bundle 500 at sides 512, 514, 516, and 518.

Figure 6:
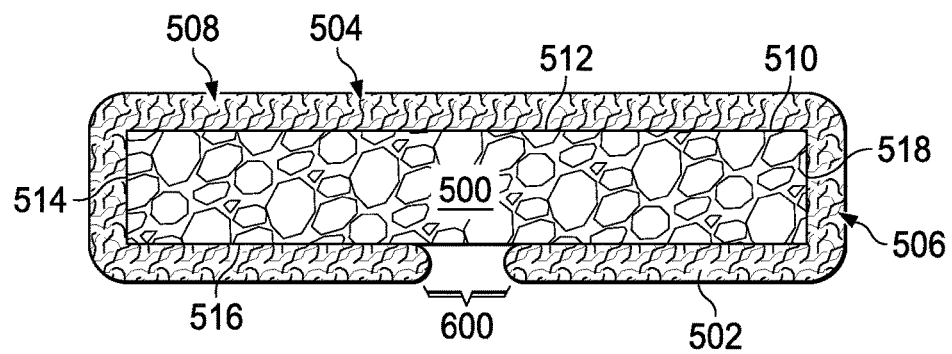
FIG. 6 is an illustration of a filament layer positioned relative to a fiber bundle in accordance with an illustrative embodiment.

With reference now to FIG. 6, an illustration of a filament layer positioned relative to a fiber bundle is depicted in accordance with an illustrative embodiment. In this illustrative example, filament layer 502 is positioned relative to fiber bundle 500 such that exposed portion 600 of outer surface 510 of fiber bundle 500 is formed at side 516. More specifically, filament layer 502 is wrapped around outer surface 510 in a manner that leaves a portion of outer surface 510 at side 516 exposed. This portion may be exposed portion 600.

Exposed portion 600 may help increase the permeability of the reinforcement layup formed using fiber bundle 500 and filament layer 502, prevent changes in the thickness of the reinforcement layup thickness that would arise from overlaying multiple filament layers under or over fiber bundle 500, and facilitate a wider manufacturing window than only using an overlapped or pinched format.

Figure 7:
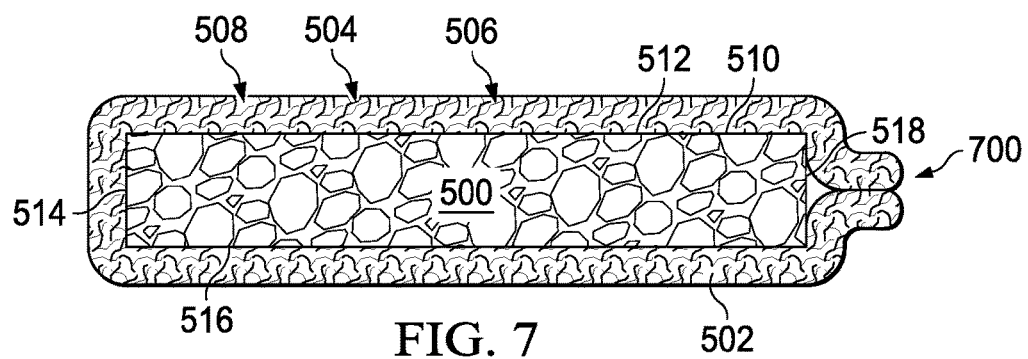
FIG. 7 is an illustration of a filament layer positioned relative to a fiber bundle in accordance with an illustrative embodiment.

With reference now to FIG. 7, an illustration of a filament layer positioned relative to a fiber bundle is depicted in accordance with an illustrative embodiment. In this illustrative example, filament layer 502 is positioned relative to fiber bundle 500 such that pinched portion 700 is formed.

In particular, filament layer 502 is wrapped around outer surface 510 of fiber bundle 500 such that a first end and a second end of filament layer 502 are located at side 518 of fiber bundle 500. The first end and the second end of filament layer 502 are pinched together at side 518 of fiber bundle 500 to form pinched portion 700.

Figure 8:
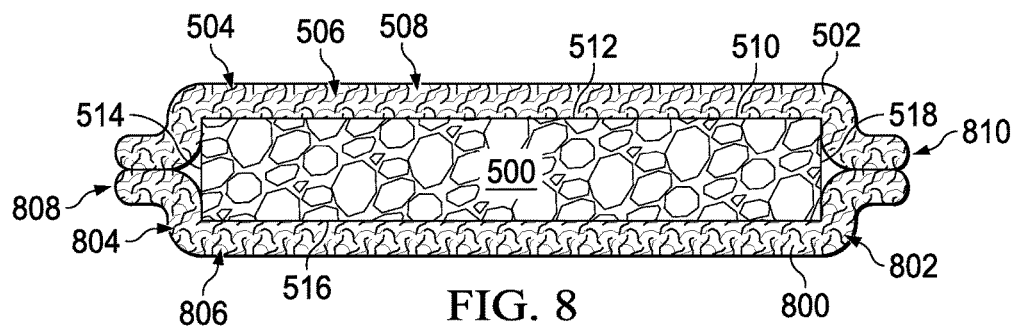
FIG. 8 is an illustration of two filament layers positioned relative to a fiber bundle in accordance with an illustrative embodiment.

With reference now to FIG. 8, an illustration of two filament layers positioned relative to a fiber bundle is depicted in accordance with an illustrative embodiment. In this illustrative example, filament layer 502 and filament layer 800 are positioned relative to side 510 and side 516, respectively, of fiber bundle 500. In this manner, filament layer 502 may be a first filament layer positioned relative to a first side of fiber bundle 500 and filament layer 800 may be a second filament layer positioned relative to a second side of fiber bundle 500.

Filament layer 800 includes discontinuous filaments 802, binding material 804, and openings 806. As depicted, a first end of filament layer 502 and a first end of filament layer 800 are pinched together to form first pinched portion 808. Further, a second end of filament layer 502 and a second end filament layer 800 are pinched together to form second pinched portion 810. In particular, the ends of filament layer 502 and filament layer 800 are pinched together at side 514 to form first pinched portion 808 and at side 518 to form second pinched portion 810.

Figure 9:
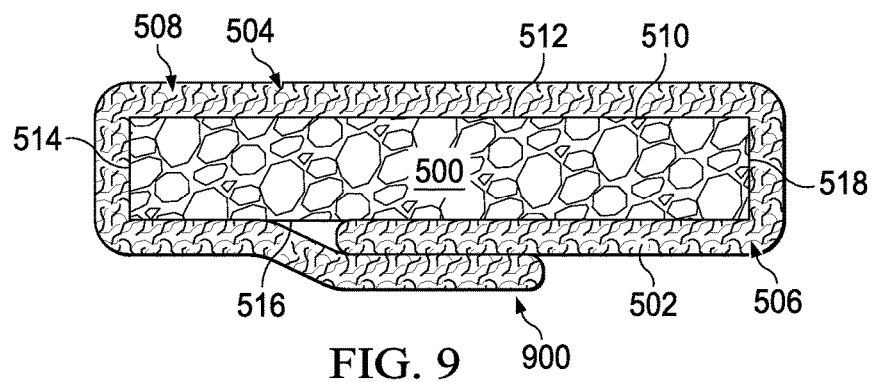
FIG. 9 is an illustration of a filament layer positioned relative to a fiber bundle in accordance with an illustrative embodiment.

With reference now to FIG. 9, an illustration of a filament layer positioned relative to a fiber bundle is depicted in accordance with an illustrative embodiment. In this illustrative example, filament layer 502 is positioned relative to fiber bundle 500 such that overlap portion 900 is formed. In particular, filament layer 502 is wrapped around outer surface 510 relative to fiber bundle 500 such that a first end and a second end of filament layer 502 overlap at side 516 of fiber bundle 500 to form overlap portion 900.

Figure 10:
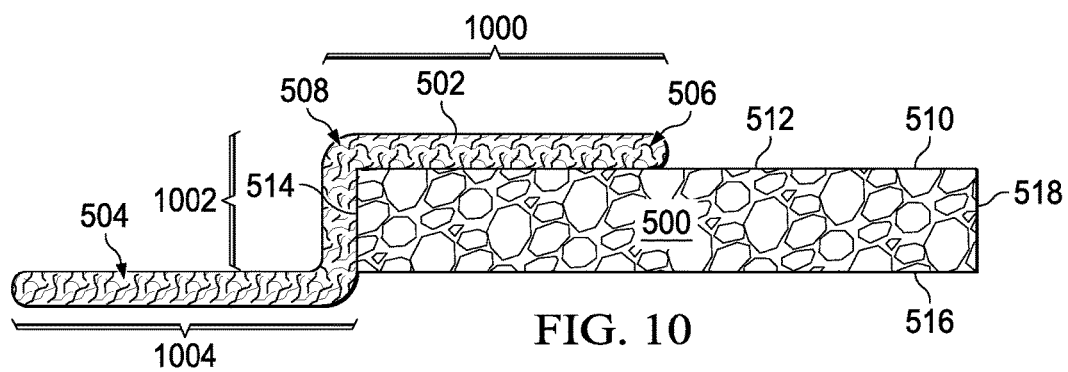
FIG. 10 is an illustration of a filament layer positioned relative to a fiber bundle in accordance with an illustrative embodiment.

With reference now to FIG. 10, an illustration of a filament layer positioned relative to a fiber bundle is depicted in accordance with an illustrative embodiment. In this illustrative example, filament layer 502 is positioned relative to fiber bundle 500. As depicted, filament layer 502 is positioned relative to fiber bundle 500 such that filament layer 502 has an S-shape.

With this S-shape, portion 1000 and portion 1002 of filament layer 502 cover fiber bundle 500. Portion 1000 covers only a portion of side 512 of fiber bundle 500. A portion of a different filament layer may be used to cover the rest of side 512. In this illustrative example, portion 1000 may be used to form an interlayer filler portion in a filament network.

Portion 1002 covers the entire side 514 of fiber bundle 500. Portion 1002 may be used to form a filler portion in the filament network.

Portion 1004 of filament layer 502 may be used to cover a portion of another fiber bundle. Portion 1004 may be used to form another interlayer filler portion in the filament network. As depicted, portion 1002 connects portion 1004 to portion 1000.

Figure 11:
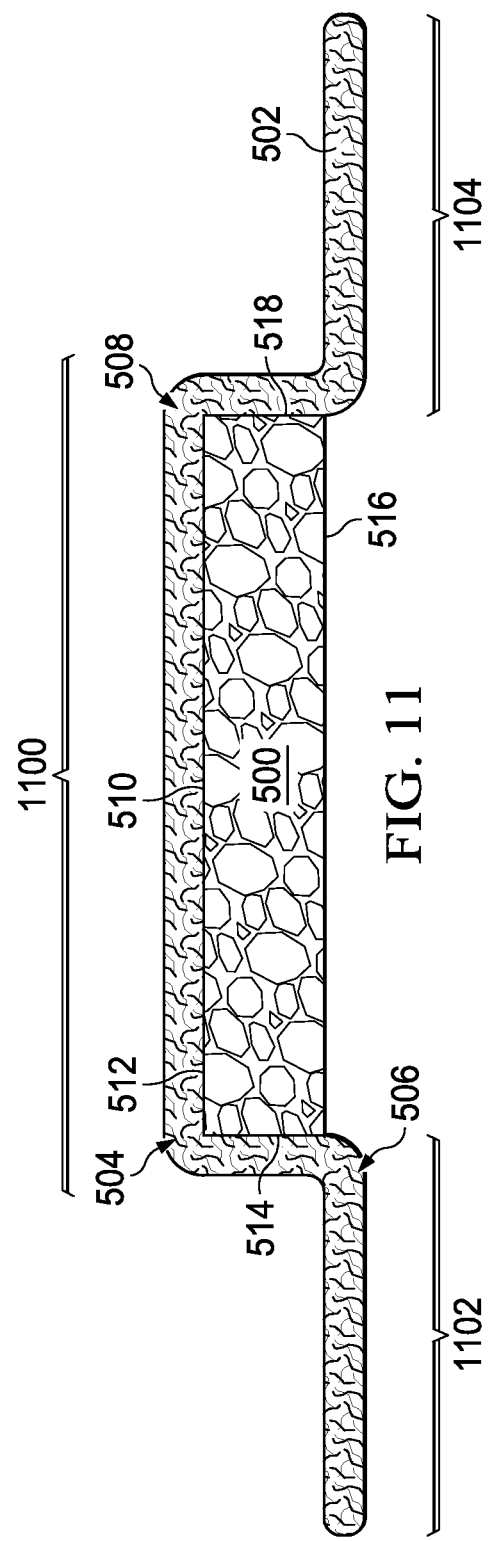
FIG. 11 is an illustration of a filament layer positioned relative to a fiber bundle in accordance with an illustrative embodiment.

With reference now to FIG. 11, an illustration of a filament layer positioned relative to a fiber bundle is depicted in accordance with an illustrative embodiment. In this illustrative example, filament layer 502 is positioned relative to fiber bundle 500. As depicted, filament layer 502 is positioned such that filament layer 502 has a hat-shape.

Portion 1100 of filament layer 502 covers the entire outer surface 510 of sides 512, 514, and 518 of fiber bundle 500. Side 516 of fiber bundle 500 is left exposed. Portion 1102 of filament layer 502 may be used to cover the side of another fiber bundle. Portion 1104 of filament layer 502 may be used to cover the side of yet another fiber bundle.

Figure 12:
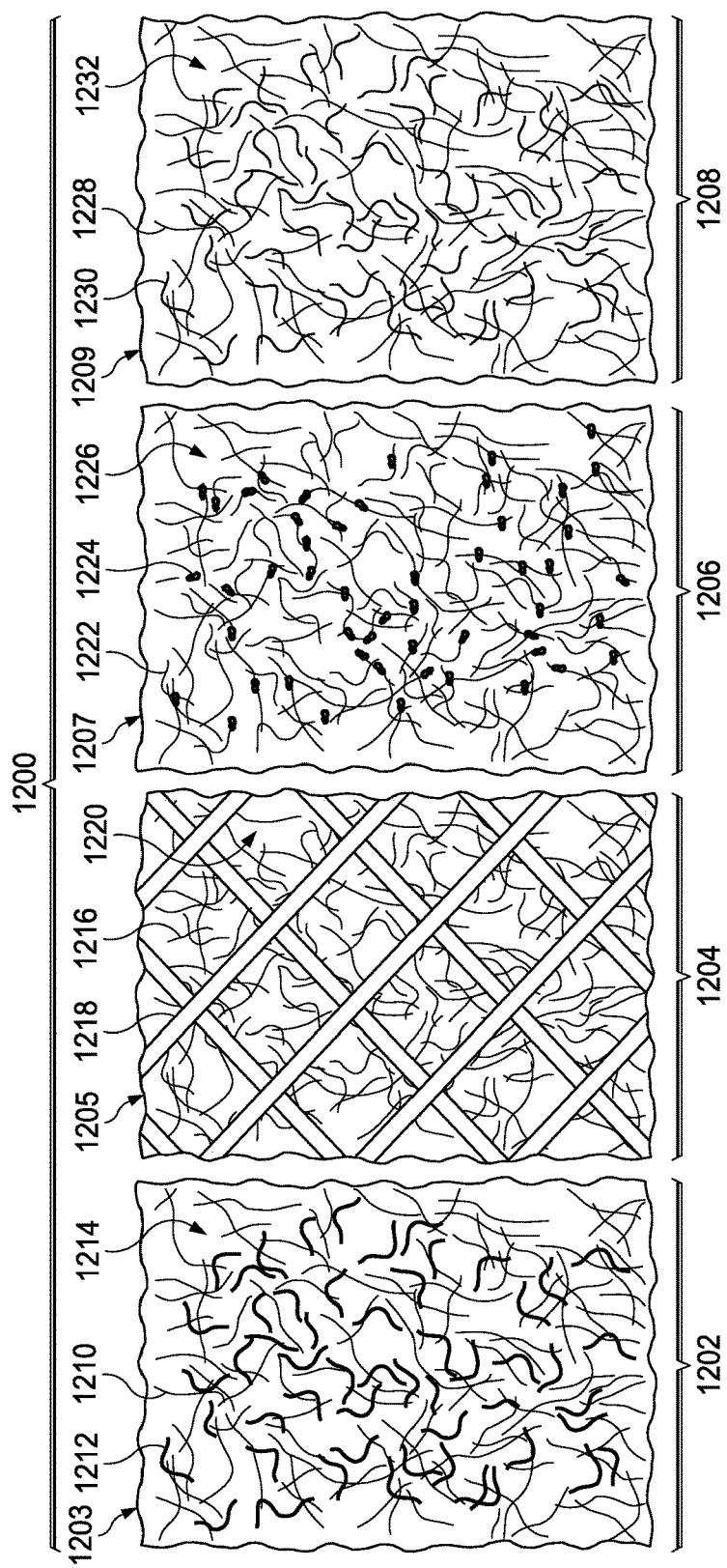
FIG. 12 is an illustration of a potential configuration for a filament layer in accordance with an illustrative embodiment.

With reference now to FIG. 12, an illustration of a potential configuration for a filament layer is depicted in accordance with an illustrative embodiment. In this illustrative example, plurality of configurations 1200 includes illustrations of some configurations for a filament layer. As depicted, plurality of configurations 1200 includes configuration 1202, configuration 1204, configuration 1206, and configuration 1208. The binding material used in each of these configurations may be different.

With configuration 1202, filament layer 1203 includes discontinuous filaments 1210, binding material 1212, and openings 1214. Binding material 1212 takes the form of thermoplastic threads. With configuration 1204, filament layer 1205 includes discontinuous filaments 1216, binding material 1218, and openings 1220. Binding material 1218 takes the form of thermoset tape that has been arranged to form a grid.

With configuration 1206, filament layer 1207 includes discontinuous filaments 1222, binding material 1224, and openings 1226. Binding material 1224 takes the form of binding particles attached to discontinuous filaments 1222. With configuration 1208, filament layer 1209 includes discontinuous filaments 1228, binding material 1230, and openings 1232. Binding material 1230 takes the form of a thermoset coating on discontinuous filaments 1228 in this illustrative example.

The illustrations of reinforcement layup 200 in FIGS. 2-3, filament layer 502 and fiber bundle 500 in FIGS. 5-11, and plurality of configurations 1200 for a filament layer in FIG. 12 are not meant to imply physical or architectural limitations to the manner in which an illustrative embodiment may be implemented. Other components in addition to or in place of the ones illustrated may be used. Some components may be optional.

The different components shown in FIGS. 2-12 may be illustrative examples of how components shown in block form in FIG. 1 can be implemented as physical structures. Additionally, some of the components in FIGS. 2-12 may be combined with components in FIG. 1, used with components in FIG. 1, or a combination of the two.

Figure 13:
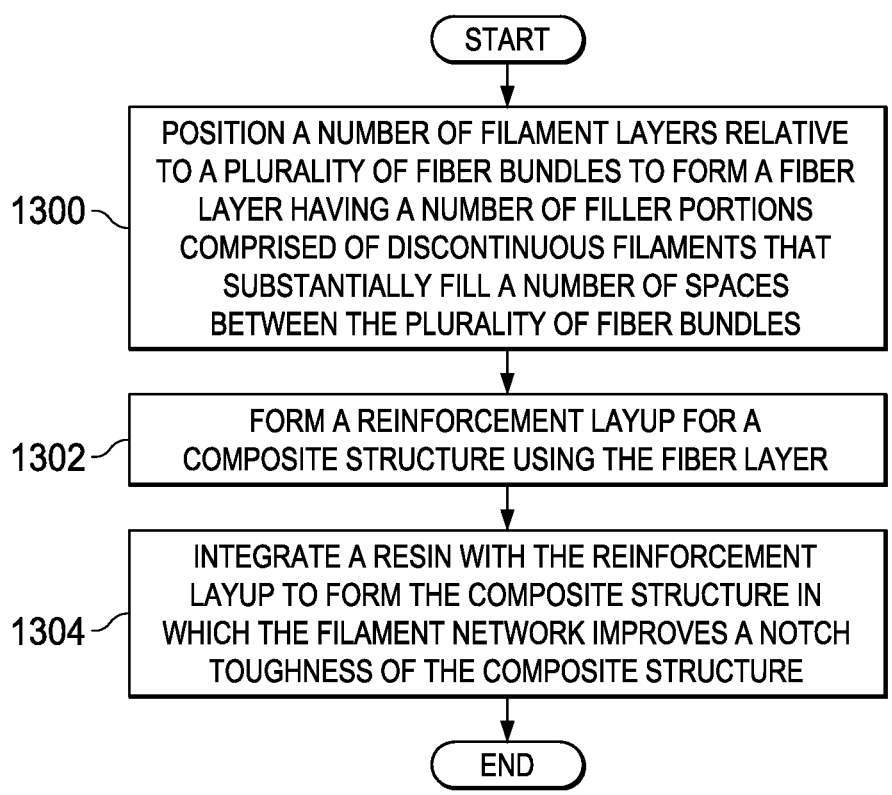
FIG. 13 is an illustration of a process for forming a composite structure in the form of a flowchart in accordance with an illustrative embodiment.

With reference now to FIG. 13, an illustration of a process for forming a composite structure is depicted in the form of a flowchart in accordance with an illustrative embodiment. The process illustrated in FIG. 13 may be implemented to form composite structure 102 in FIG. 1.

The process may begin by positioning a number of filament layers relative to a plurality of fiber bundles to form a fiber layer having a number of filler portions comprised of discontinuous filaments that substantially fill a number of spaces between the plurality of fiber bundles (operation 1300). Next, the fiber layer is used to form a reinforcement layup for a composite structure (operation 1302).

A resin is integrated with the reinforcement layup to form the composite structure in which the filament network improves a notch toughness of the composite structure (operation 1304), with the process terminating thereafter. The composite structure may be left uncured, partially cured, or fully cured, depending on the implementation.

Figure 14:
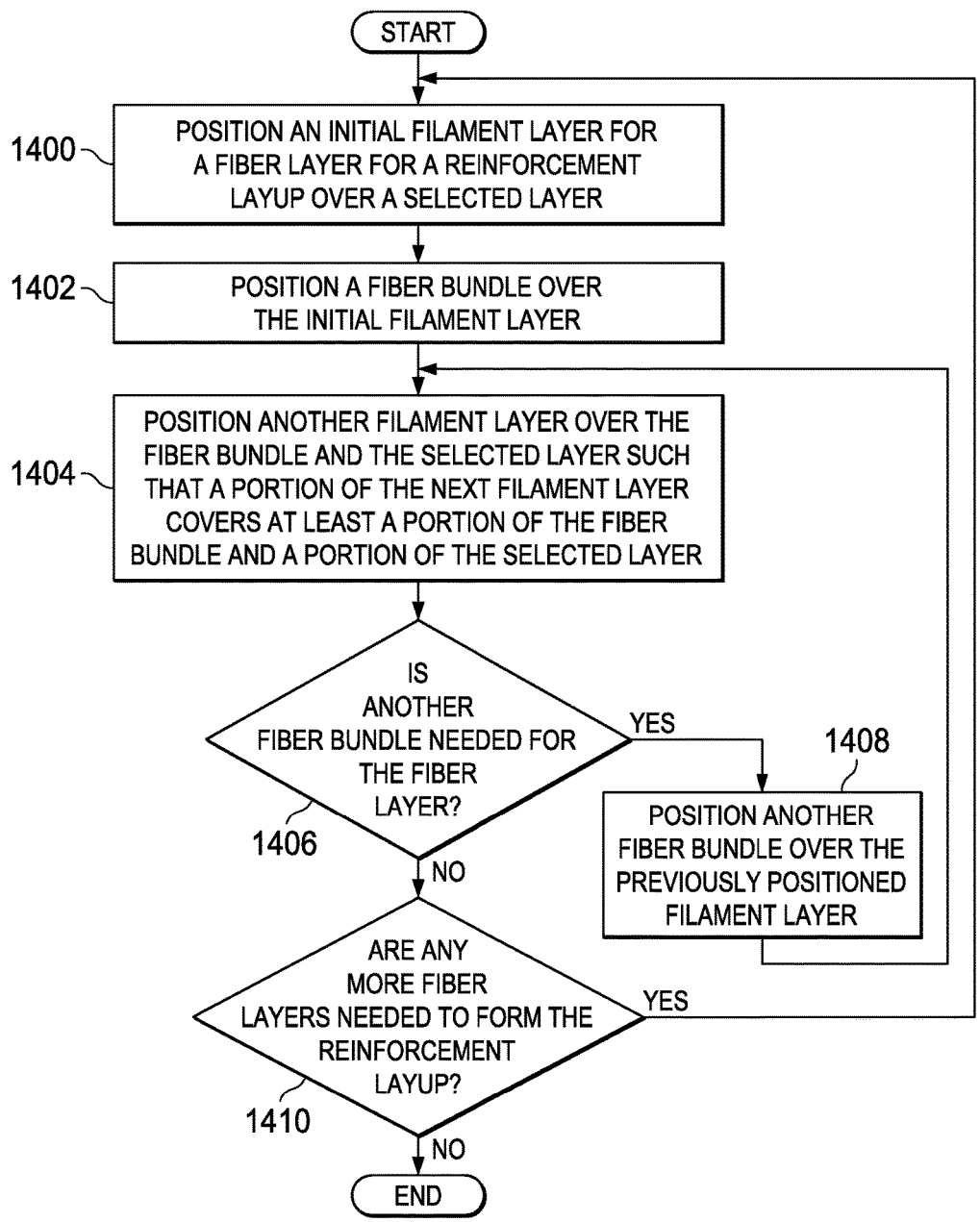
FIG. 14 is an illustration of a process for forming a reinforcement layup in the form of a flowchart in accordance with an illustrative embodiment.

With reference now to FIG. 14, an illustration of a process for forming a reinforcement layup is depicted in the form of a flowchart in accordance with an illustrative embodiment. The process illustrated in FIG. 14 may be implemented to form composite structure 102 in FIG. 1.

The process may begin by positioning an initial filament layer for a fiber layer for a reinforcement layup over a selected layer (operation 1400). The first time that operation 1400 is performed, the selected layer is the surface of a tooling apparatus, such as a mold. Any subsequent times that operation 1400 is performed, the selected layer may be the previous fiber layer formed.

A fiber bundle is then positioned over the initial filament layer (operation 1402). Another filament layer is then positioned over the fiber bundle and the selected layer such that a portion of the next filament layer covers at least a portion of the fiber bundle and a portion of the selected layer (operation 1404). In operation 1404, the filament layer is positioned such that the filament layer has an S-shape.

Thereafter, a determination is made as to whether another fiber bundle is needed for the fiber layer (operation 1406). If an additional fiber bundle is needed, another fiber bundle is positioned over the previously positioned filament layer (operation 1408). The process then returns to operation 1404 as described above.

With respect to operation 1406, if an additional fiber bundle is not needed for the initial fiber layer, a determination is made as to whether any more fiber layers are needed to form the reinforcement layup (operation 1410). If no additional fiber layers are needed to form the reinforcement layup, the process terminates. A reinforcement layup is formed by performing the process described in FIG. 14. Resin may be infused within the reinforcement layup to form an integrated preform. The integrated preform may then be cured to form a composite structure, such as a composite laminate.

With reference again to operation 1410, if any additional fiber layers are needed to form the reinforcement layup, the process returns to operation 1400 as described above. The process described in FIG. 14 ensures that the discontinuous filaments in each of the filament layers used to form the reinforcement layup substantially fill the spaces between the fiber bundles within each fiber layer of the reinforcement layup.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, a portion of an operation or step, some combination thereof.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 15:
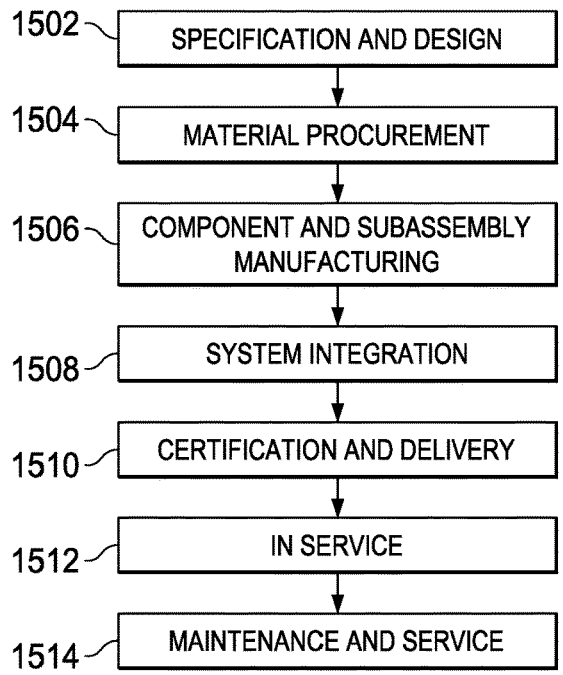
FIG. 15 is an illustration of an aircraft manufacturing and service method in the form of a block diagram in accordance with an illustrative embodiment.
Figure 16:
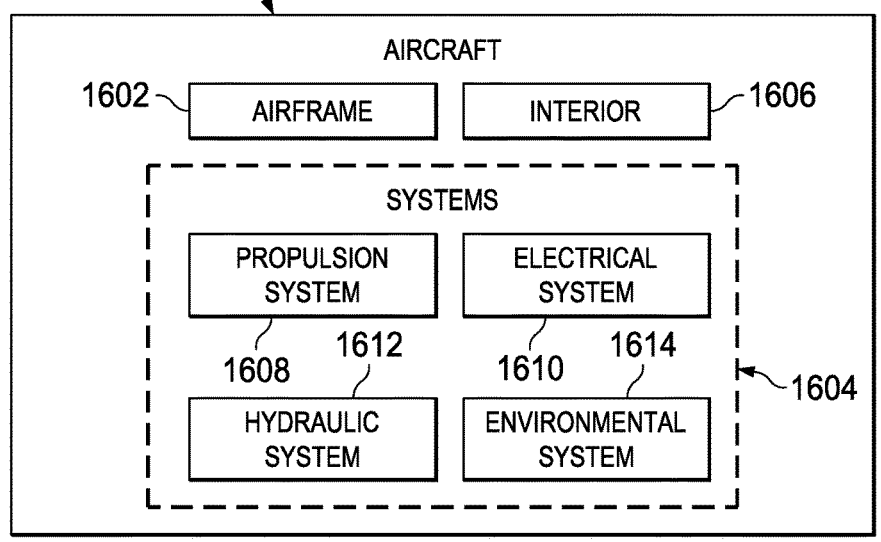
FIG. 16 is an illustration of an aircraft in the form of a block diagram in which an illustrative embodiment may be implemented.

Illustrative embodiments of the disclosure may be described in the context of aircraft manufacturing and service method 1500 as shown in FIG. 15 and aircraft 1600 as shown in FIG. 16. Turning first to FIG. 15, an illustration of an aircraft manufacturing and service method is depicted in the form of a block diagram in accordance with an illustrative embodiment. During pre-production, aircraft manufacturing and service method 1500 may include specification and design 1502 of aircraft 1600 in FIG. 16 and material procurement 1504.

During production, component and subassembly manufacturing 1506 and system integration 1508 of aircraft 1600 in FIG. 16 takes place. Thereafter, aircraft 1600 in FIG. 16 may go through certification and delivery 1510 in order to be placed in service 1512. While in service 1512 by a customer, aircraft 1600 in FIG. 16 is scheduled for routine maintenance and service 1514, which may include modification, reconfiguration, refurbishment, and other maintenance or service.

Each of the processes of aircraft manufacturing and service method 1500 may be performed or carried out by at least one of a system integrator, a third party, or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 16, an illustration of an aircraft is depicted in the form of a block diagram in which an illustrative embodiment may be implemented. In this example, aircraft 1600 is produced by aircraft manufacturing and service method 1500 in FIG. 15 and may include airframe 1602 with plurality of systems 1604 and interior 1606. Examples of systems 1604 include one or more of propulsion system 1608, electrical system 1610, hydraulic system 1612, and environmental system 1614. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1500 in FIG. 15. In particular, composite structure 102 from FIG. 1 may be manufactured during any one of the stages of aircraft manufacturing and service method 1500. For example, without limitation, composite structure 102 from FIG. 1 may be manufactured during at least one of component and subassembly manufacturing 1506, system integration 1508, routine maintenance and service 1514, or some other stage of aircraft manufacturing and service method 1500. Still further, composite structure 102 from FIG. 1 may be used in one or more structures of aircraft 1600. For example, composite structure 102 may be used to form a structure in airframe 1602, interior 1606, or some other part of aircraft 1600.

In one illustrative example, components or subassemblies produced in component and subassembly manufacturing 1506 in FIG. 15 may be fabricated or manufactured in a manner similar to components or subassemblies produced while aircraft 1600 is in service 1512 in FIG. 15. As yet another example, one or more apparatus embodiments, method embodiments, or a combination thereof may be utilized during production stages, such as component and subassembly manufacturing 1506 and system integration 1508 in FIG. 15. One or more apparatus embodiments, method embodiments, or a combination thereof may be utilized while aircraft 1600 is in service 1512, during maintenance and service 1514 in FIG. 15, or both. The use of a number of the different illustrative embodiments may substantially expedite the assembly of and reduce the cost of aircraft 1600.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A composite structure comprising:
    a number of fiber layers, a filament network associated with the number of fiber layers, and a resin;
    a number of interlayer filler portions comprised of discontinuous filaments and located between the number of fiber layers;
    wherein each fiber layer in the number of fiber layers includes a plurality of fiber bundles having a number of spaces between the plurality of fiber bundles;
    wherein the filament network comprises a number of filler portions comprised of discontinuous filaments that substantially fill the number of spaces between the plurality of fiber bundles;
    wherein the discontinuous filaments do not extend an entire length or width of the composite structure; and
    wherein the number of fiber layers comprise at least two fiber layers;
    wherein the number of fiber layers are laid up to form a reinforcement layup;
    wherein the resin is infused within the number of fiber layers;
    wherein the resin binds the number of fiber layers and the filament network associated with the number of fiber layers together; and
    wherein the discontinuous filaments are selected from a group consisting of silica fibers, polyamide fibers, polyether ketone fibers, polyester fibers, polyether sulfone fibers, polyimide fibers, and polyurethane fibers.

2. The composite structure of claim 1 further comprising:
a number of outer filler portions comprised of the discontinuous filaments and located around the number of fiber layers.

3. The composite structure of claim 1, wherein the number of filler portions form a portion of the filament network in the reinforcement layup.

4. The composite structure of claim 3, wherein the filament network provides open spaces through which at least one of the resin or air are allowed to flow.

5. The composite structure of claim 3, wherein the filament network provides open spaces through which at least one of air, undesired gases, or excess moisture are allowed to be removed.

6. The composite structure of claim 1 further comprising:
a number of filament layers positioned relative to the plurality of fiber bundles to form the number of filler portions, wherein a filament layer in the number of filament layers is selected from one of a nonwoven mat, a veil, a web, a sheet, and a tape.

7. The composite structure of claim 1, wherein the number of filler portions further comprises:
a binding material configured to hold the discontinuous filaments together, the number of filler portions to the plurality of fiber bundles, and the plurality of fiber bundles together in response to at least one of heat, pressure, or a chemical reaction being applied to the binding material.

8. The composite structure of claim 1, wherein the discontinuous filaments include filaments of at least one of different sizes, different diameters, different cross-sectional shapes, or different types.

9. The composite structure of claim 1, wherein the discontinuous filaments are configured to improve a notch toughness of the composite structure and a resistance of the composite structure to a number of inconsistencies.

10. A composite structure comprising:
a number of fiber layers, wherein each fiber layer in the number of fiber layers includes a plurality of fiber bundles having a number of spaces between the plurality of fiber bundles;
a number of interlayer filler portions comprised of discontinuous filaments and located between the number of fiber layers;
a filament network comprising discontinuous filaments that substantially fill the number of spaces between the plurality of fiber bundles associated with the number of fiber layers and that are configured to improve a notch toughness of the composite structure and a resistance of the composite structure to a number of undesired inconsistencies; and
a resin that binds the number of fiber layers and the filament network associated with the number of fiber layers together;
wherein the discontinuous filaments do not extend an entire length or width of the composite structure; and
wherein the number of fiber layers comprise at least two fiber layers; wherein the number of fiber layers are laid up to form a reinforcement layup;
wherein the resin is infused within the number of fiber layers;
wherein the resin binds the number of fiber layers and a filament network associated with the number of fiber layers together; and wherein the discontinuous filaments are selected from a group consisting of silica fibers, polyamide fibers, polyether ketone fibers, polyester fibers, polyether sulfone fibers, polyimide fibers, and polyurethane fibers.

11. The composite structure of claim 10, wherein the filament network comprises:
a number of filler portions that fill the number of spaces between the plurality of fiber bundles in each of the number of fiber layers, wherein a filler portion in the number of filler portions comprises:
a binding material configured to hold the discontinuous filaments together and bind the discontinuous filaments to at least one of the plurality of fiber bundles.

12. The composite structure of claim 11, wherein the composite structure is one of a fully cured composite structure, a partially cured composite structure, and an uncured composite structure.

13. The composite structure of claim 10, wherein the discontinuous filaments are configured to improve a notch toughness of the composite structure and a resistance of the composite structure to a number of inconsistencies.

14. A method for forming a composite structure, the method comprising:
positioning a number of filament layers comprised of discontinuous filaments relative to a plurality of fiber bundles to form a fiber layer having a number of filler portions that substantially fill a number of spaces between the plurality of fiber bundles;
positioning a number of interlayer filler portions comprised of the discontinuous filaments and located between a number of fiber layers; and
forming a reinforcement layup for the composite structure using the fiber layer;
wherein the discontinuous filaments do not extend an entire length or width of the composite structure;
wherein the number of fiber layers are laid up to form a reinforcement layup;
wherein a resin is infused within the number of fiber layers;
wherein the resin binds the number of fiber layers and a filament network associated with the number of fiber layers together; and
wherein the discontinuous filaments are selected from a group consisting of silica fibers, polyamide fibers, polyether ketone fibers, polyester fibers, polyether sulfone fibers, polyimide fibers, and polyurethane fibers.

15. The method of claim 14 further comprising:
integrating a resin with the reinforcement layup to form the composite structures.

16. The method of claim 14, wherein forming the fiber layer using the plurality of fiber bundles and the number of filament layers comprises:
positioning a filament layer relative to a fiber bundle such that the filament layer forms an S-shape.

17. The method of claim 14, wherein forming the fiber layer using the plurality of fiber bundles and the number of filament layers comprises:
wrapping a filament layer in the number of filament layers around an outer surface of a fiber bundle in the plurality of fiber bundles such that at least one of the number of filament layers covers an entirety of the outer surface of the fiber bundle or leaves an exposed portion of the outer surface of the fiber bundle.

18. The method of claim 14, wherein forming the fiber layer using the plurality of fiber bundles and the number of filament layers comprises:

wrapping a filament layer in the number of filament layers around an outer surface of a fiber bundle in the plurality of fiber bundles; and pinching a first end and a second end of the filament layer together at a side of the fiber bundle to form a pinched portion.

19. The method of claim 14, wherein forming the fiber layer using the plurality of fiber bundles and the number of filament layers comprises:

wrapping a filament layer in the number of filament layers around an outer surface of a fiber bundle in the plurality of fiber bundles such that a first end and a second end of the filament layer overlap at a side of the fiber bundle to form an overlap portion.

20. The method of claim 14, wherein forming the fiber layer using the plurality of fiber bundles and the number of filament layers comprises:

positioning a first filament layer in the number of filament layers relative to a first side of a fiber bundle in the plurality of fiber bundles;

positioning a second filament layer in the number of filament layers relative to a second side of the fiber bundle; and pinching a first end of the first filament layer and a first end of the second filament layer together to form a first pinched portion and a second end of the first filament layer and a second end of the second filament layer together to form a second pinched portion.

\* \* \* \* \*

UNITED STATES PATENT AND TRADEMARK OFFICE
CERTIFICATE OF CORRECTION

| | |
|---|---|
| PATENT NO. | : 10,081,722 B2 |
| APPLICATION NO. | : 14/224278 |
| DATED | : September 25, 2018 |
| INVENTOR(S) | : Meure et al. |

It is certified that error appears in the above-identified patent and that said Letters Patent is hereby corrected as shown below:

On the Title Page

(57) Abstract, Line 6, change "A number of filler is" to "A number of filler portions is".

In the Claims

Column 16, Line 49, change "integrating a resin with" to "integrating the resin with".

Signed and Sealed this
Twenty-fourth Day of September, 2019

Andrei Iancu
*Director of the United States Patent and Trademark Office*